United States Patent
Smith et al.

(10) Patent No.: US 11,465,776 B2
(45) Date of Patent: Oct. 11, 2022

(54) CHARGING SYSTEM FOR AUTONOMOUS DRONES

(71) Applicant: Arizona Board of Regents on behalf of Arizona State University, Scottsdale, AZ (US)

(72) Inventors: Tyler Smith, Phoenix, AZ (US); Sami Mian, Scottsdale, AZ (US); Kevin Westgard, Gilbert, AZ (US); Glenn Pace, Scottsdale, AZ (US); John Patterson, Tempe, AZ (US)

(73) Assignee: Arizona Board of Regents on behalf of Arizona State University, Scottsdale, AZ (US)

( * ) Notice: Subject to any disclaimer, the term of this patent is extended or adjusted under 35 U.S.C. 154(b) by 295 days.

(21) Appl. No.: 16/825,911

(22) Filed: Mar. 20, 2020

(65) Prior Publication Data

US 2020/0307829 A1 Oct. 1, 2020

Related U.S. Application Data

(60) Provisional application No. 62/824,036, filed on Mar. 26, 2019.

(51) Int. Cl.
*B64F 1/36* (2017.01)
*H02J 7/00* (2006.01)
(Continued)

(52) U.S. Cl.
CPC .......... *B64F 1/362* (2013.01); *B64C 25/001* (2013.01); *B64C 39/024* (2013.01);
(Continued)

(58) Field of Classification Search
CPC ..... B64F 1/362; B64C 25/001; B64C 39/024; B64C 2201/027; B64C 2201/042; H02J 7/0045; H02J 7/0047; H02J 2207/20
(Continued)

(56) References Cited

U.S. PATENT DOCUMENTS

2011/0264314 A1* 10/2011 Parras .................. G05D 1/0676
701/16
2016/0200207 A1* 7/2016 Lee .......................... B64C 25/32
244/17.23
(Continued)

FOREIGN PATENT DOCUMENTS

CN 207029561 U * 2/2018

OTHER PUBLICATIONS

Al Juheshi, F. et al. (2017). Novel adaptive battery system for integration with multi-level inverters, Electro Information Technology (EIT) 2017 IEEE International Conference on, (pp. 066-070). IEEE.

(Continued)

*Primary Examiner* — Richard Isla
*Assistant Examiner* — Dung V Bui
(74) *Attorney, Agent, or Firm* — Snell & Wilmer L.L.P.

(57) ABSTRACT

A base station configured for charging an autonomous drone may comprise a first conductive groove and a second conductive groove. The first conductive groove and the second conductive groove may be configured to interface with a first conductive strip and a second conductive strip disposed on a landing gear of the autonomous drone. The base station may be configured to charge a battery of the autonomous drone in response to the first conductive groove interfacing with the first conductive strip and the second conductive groove interfacing with the second conductive strip.

4 Claims, 10 Drawing Sheets

(51) Int. Cl.
*B64C 39/02* (2006.01)
*B64C 25/00* (2006.01)

(52) U.S. Cl.
CPC .......... *H02J 7/0045* (2013.01); *H02J 7/0047* (2013.01); *B64C 2201/027* (2013.01); *B64C 2201/042* (2013.01); *H02J 2207/20* (2020.01)

(58) Field of Classification Search
USPC .......................................................... 320/109
See application file for complete search history.

(56) References Cited

U.S. PATENT DOCUMENTS

| | | | | |
|---|---|---|---|---|
| 2016/0347450 | A1* | 12/2016 | Raniere | B64C 25/52 |
| 2017/0158352 | A1* | 6/2017 | von Flotow | B64D 5/00 |
| 2017/0282735 | A1* | 10/2017 | Yamamura | G05D 1/0225 |
| 2017/0297738 | A1* | 10/2017 | von Flotow | B64C 39/024 |
| 2017/0320570 | A1* | 11/2017 | Horn | B64D 47/08 |
| 2018/0148170 | A1* | 5/2018 | Stamatovski | B64F 1/18 |
| 2018/0327093 | A1* | 11/2018 | von Flotow | B64C 27/10 |
| 2019/0033889 | A1* | 1/2019 | von Flotow | G05D 1/0661 |
| 2019/0084670 | A1* | 3/2019 | Sharma | B64C 39/024 |

OTHER PUBLICATIONS

Buchmann, I. (2018). Batteries in a portable world: a handbook on rechargeable batteries for non-engineers. Ec & M Books. Retrieved from http://batteryuniversity.com/learn/article/nickel_based_batteries.

Dunn, Terry (Mar. 2015). Battery Guide: The Basics of Lithium-Polymer Batteries. Tested. Whalerock Industries.

Fujii, K., Higuchi, K., Rekimoto, J. (Dec. 2013). Endless flyer: a continuous flying drone with automatic battery replacement. In Ubiquitous Intelligence and Computing, 2013 IEEE 10th International Conference on and 10th International Conference on Autonomic and Trusted Computing (UIC/ATC)(pp. 216-223). IEEE.

Toksoz, T. (2012). Design and implementation of an automated battery management platform (Doctoral dissertation, Massachusetts Institute of Technology).

Sundaram, S. M., Kulkarni, M., & Diwakar, V. (Aug. 2015). Management of large format liion batteries. In Transportation Electrification Conference (ITEC), 2015 IEEE International (pp. 1-7). IEEE.

* cited by examiner

CHARGING SYSTEM FOR AUTONOMOUS DRONES

CROSS-REFERENCE TO RELATED APPLICATIONS

This application is a nonprovisional of, and claims priority to, and the benefit of U.S. Provisional Application No. 62/824,036 entitled "CHARGING SYSTEM FOR AUTONOMOUS DRONES" and filed on Mar. 26, 2019, which is hereby incorporated by reference in its entirety.

TECHNICAL FIELD

The present disclosure relates to a charging system and in particular a charging system for use with autonomous drones.

BACKGROUND

Prior charging systems for drones have suffered from various drawbacks, including limitations due to high cost, long charge duration, a tight landing area, and mechanical complexity. Accordingly, improved charging systems remain desirable.

SUMMARY

A base station system for an autonomous drone is disclosed herein. The base station system may comprise: a base station, comprising: a housing; a first charging pad coupled to the housing; and a second charging pad proximate the first charging pad.

In various embodiments, the base station system may further comprise a power source, wherein the first charging pad comprises a first conductive groove in electrical contact with the power source, and wherein the second charging pad comprises a second conductive groove in electrical contact with the power source. The first charging pad and the second charging pad may each comprise a first tapered portion and a second tapered portion, wherein the first tapered portion and the second tapered portion are terminated at the first conductive groove and the second conductive groove. The first charging pad and the second charging pad may each comprise a first end and a second end with the first conductive groove and the second conductive groove are disposed between the first end and the second end, the first end having a first aperture and the second end having a second aperture. The first conductive groove and the second conductive groove may be configured to receive a first conductive strip and a second conductive strip of a landing gear of a drone. The first charging pad and the second charging pad may form a charging contact array.

An autonomous drone is disclosed herein. The autonomous drone may comprise: a battery; and a landing gear, comprising: a left charging tube having a left conductive strip in electrical communication with the battery; a right charging tube having a right conductive strip in electrical communication with the battery.

In various embodiments, the autonomous drone may further comprise a main body, wherein the landing gear further comprises a left aft leg and a left forward leg, wherein the left aft leg extends from the main body to the left charging tube, and wherein the left forward leg extends from the main body to the left forward leg. The battery may be disposed within the main body, and a wiring may be disposed in at least one of the left aft leg and the left forward leg. The left charging tube may extend from the left aft leg to the left forward leg. The landing gear may further comprise a left aft foot and a left forward foot, wherein the left aft foot is coupled to the left aft leg and the left charging tube, and wherein the left forward foot is coupled to the left forward leg and the left charging tube. The left conductive strip and the right conductive strip may be disposed proximate a ground when the autonomous drone is in a landed state on the ground. The left conductive strip and the right conductive strip may be configured to interface with a left conductive groove and a right conductive groove of a base station. The battery may be configured to be charged when the left conductive strip interfaces with the left conductive groove and the right conductive strip interfaces with the right conductive groove.

A charging system for an autonomous drone is disclosed herein. The charging system may comprise: a power source; a buck converter having a voltage output and a ground output, the buck converter being in electrical contact with the power source; a first conductive groove in electrical contact with the voltage output; a second conductive groove in electrical contact with the ground output.

In various embodiments, the charging system may further comprise a left charging tube having a left conductive strip and a right charging tube having a right conductive strip. The left conductive strip may be configured to interface with the first conductive groove, and the right conductive strip may be configured to interface with the second conductive groove. The charging system may further comprise a battery disposed in the autonomous drone. The battery may be configured to charge when the left conductive strip interfaces with the first conductive groove and the right conductive strip interfaces with the second conductive groove. The charging system may further comprise a main voltage control and a housing, wherein the main voltage control is in electrical communication with the power source, and wherein the buck converter and the main voltage control are disposed within the housing. The charging system may further comprise a sensor and a control system, wherein the sensor is in operable communication with the first conductive groove and the second conductive groove, wherein the control system is in electrical communication with the buck converter, the sensor, and the main voltage control, and wherein the sensor and the control system are disposed in the housing.

The contents of this section are intended as a brief introduction to the disclosure, and are not intended to limit the scope of any claim.

BRIEF DESCRIPTION OF THE DRAWINGS

With reference to the following description and accompanying drawings.

DETAILED DESCRIPTION

The following description is of various example embodiments only, and is not intended to limit the scope, applicability or configuration of the present disclosure in any way. Rather, the following description is intended to provide a convenient illustration for implementing various embodiments including the best mode. As will become apparent, various changes may be made in the function and arrangement of the elements described in these embodiments without departing from principles of the present disclosure.

Principles of the present disclosure contemplate the use of a charging system comprising a base station and an autonomous drone. Prior approaches for charging autonomous drones, for example, involved wireless charging pads and full contact charging pads. These charging systems result in expensive systems that require a tight landing area and a longer charging time.

As used herein, "aft" refers to the direction associated with the tail (e.g., the back end) of a drone. As used herein, "forward" refers to the direction associated with the front end of a drone, or generally, to the direction of flight or motion.

Figure 1:
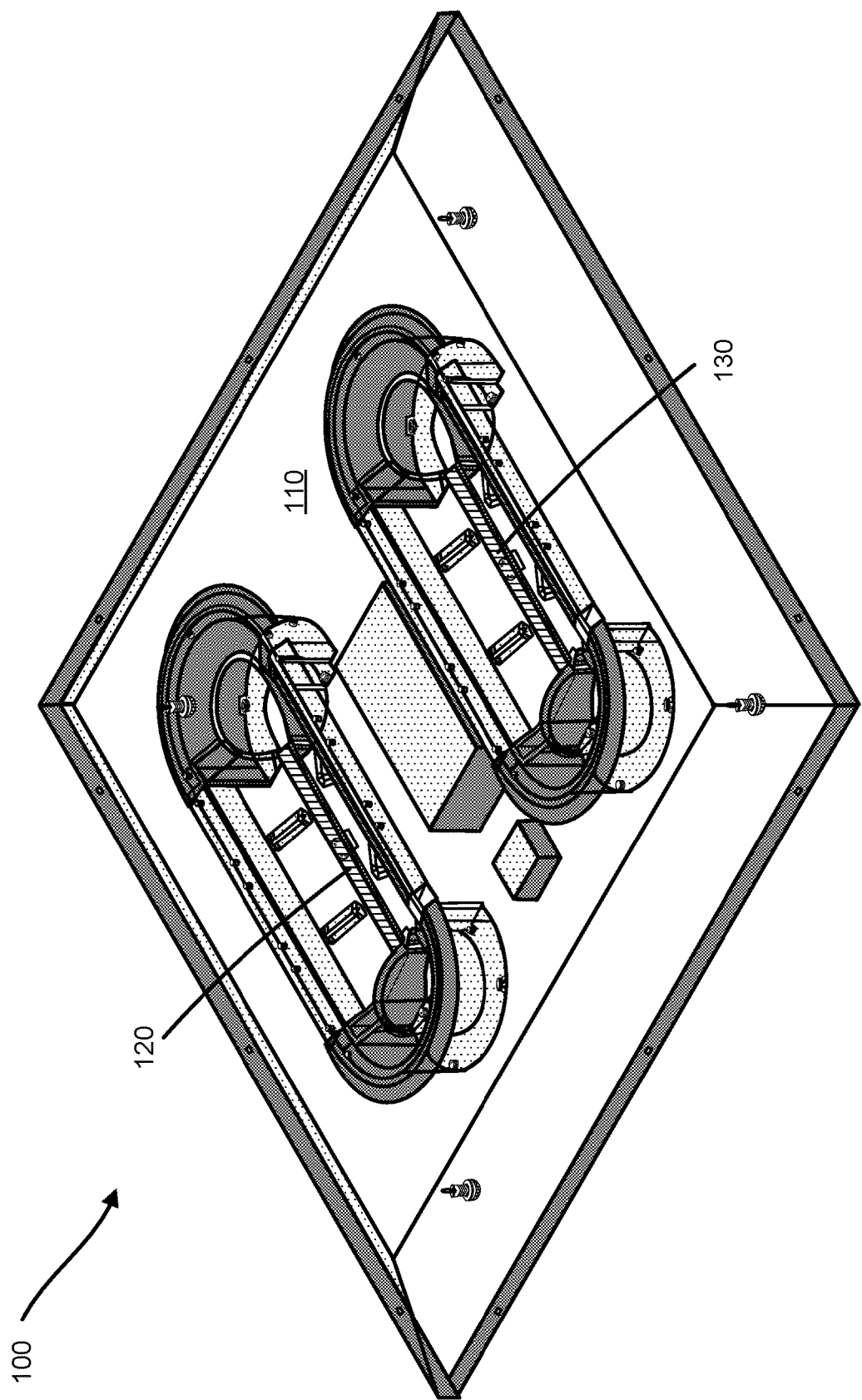
FIG. 1 illustrates a base station system for an autonomous drone, in accordance with an exemplary embodiment.

With reference now to FIG. 1, principles of the present disclosure allow for a low-cost solution to these and other problems by utilizing a base station system comprising two charging contacts and a housing for the electrical components. In an example embodiment, a base station 100 for an autonomous drone may comprise a housing 110, a first charging pad 120, and a second charging pad 130. The first charging pad 120 and the second charging pad 130 may form a charging array 120, 130 and may be integral to the housing 110. The charging pads 120, 130 may be separate components that are installed into the housing 110. The charging array 120, 130 may be attached to the housing 110 by an adhesive, such as glue, cement, casein, mucilage, or paste, by press fit, by fasteners, or by any other method known in the art. The base station may be made of various metals, plastic, composites, or any other material known in the art. In an example embodiment, the base station may be made of 5052 Aluminum, or any other aluminum material known in the art.

The housing 110 may be configured to house electrical components, such as a power source, a main voltage control, a buck converter, a cooling system, a contact charging system, and a control system, or the like. The charging array 120, 130 is configured to receive landing gear of a drone, as described further herein.

Figure 2:
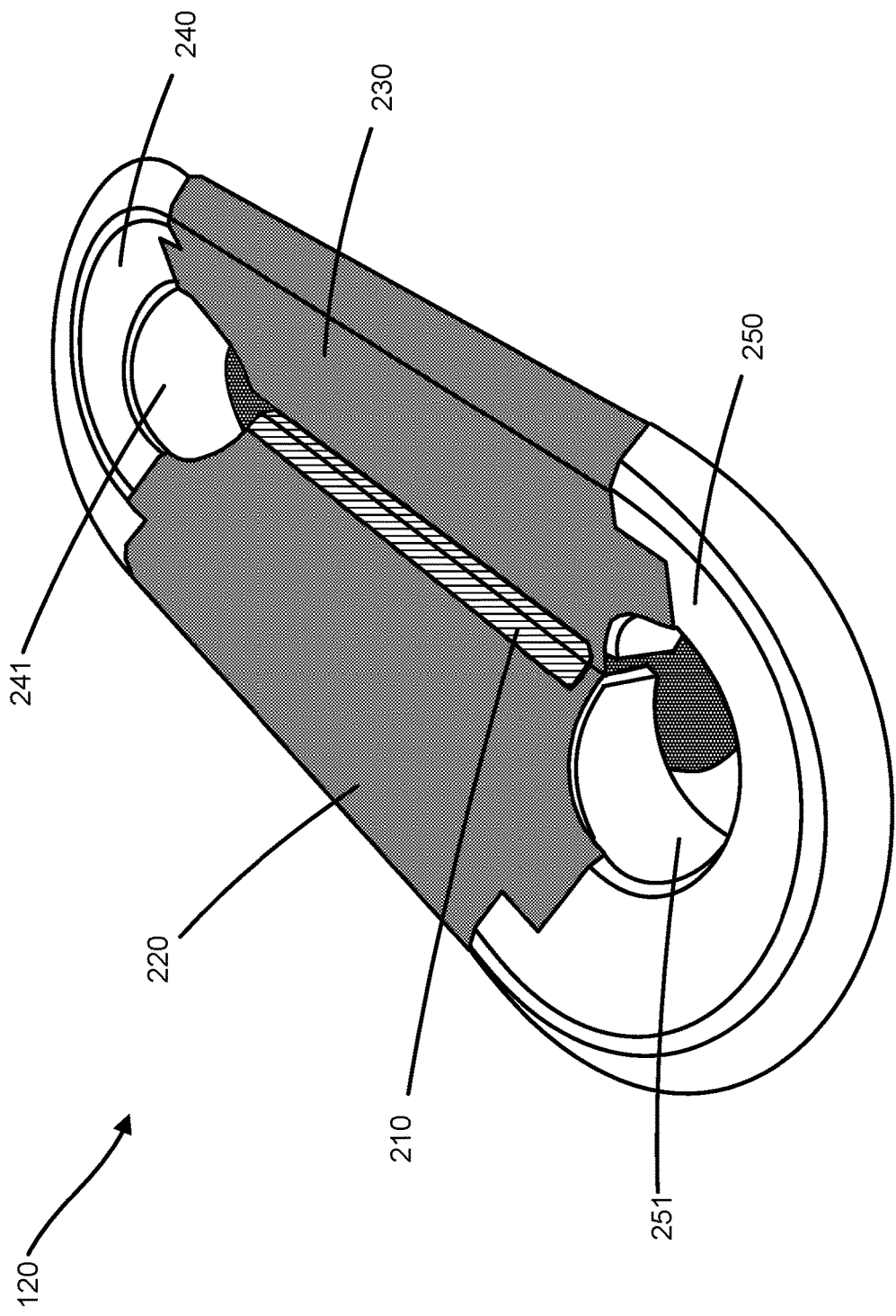
FIG. 2 illustrates a base station system for an autonomous drone, in accordance with an exemplary embodiment.

With reference now to FIG. 2, a first charging pad 120, in accordance with an example embodiment is illustrated. In an example embodiment, first charging pad 120 may comprise a first conductive groove 210, a first tapered portion 220, a second tapered portion 230, a first end 240, and a second end 250. The first end 240 may further comprise a first aperture 241 and the second end 250 may comprise a second aperture 251. The apertures 241, 251 are configured to allow water to drain through the housing. Additionally, the apertures 241, 251 ensure that a leg of the landing gear may contact the conductive groove and obtain a charge for the battery of the drone. The first charging pad 120 may be electrically connected to a power source (not shown). The first charging pad 120 may be made of plastic, composites, or any non-conductive material known in the art. The tapered portions 220, 230 may be made of plastic, composites, or any other non-conductive and/or slippery material known in the art. The tapered portions 220, 230 may provide error correction for an autonomous drone landing by funneling the corresponding conductive strip of a landing leg of the landing gear to the first conductive groove 210 of the charging pad 120. Then first conductive groove 210 may be made of aluminum, gold-plated nickel, copper, brass, or any other conductive material. In an example embodiment, the conductive groove is made of brass. The conductive grooves are configured to receive an autonomous drone landing gear with corresponding conductive strip on a landing leg.

In an example embodiment, the first end 240 and the second end 250 are semi-spherical in shape. The first tapered portion 220 and the second tapered portion 230 extend from the first end 240 to the second end 250. The first conductive groove 210 may comprise a V-groove, or the like. In this regard, the first conductive groove 210 may provide increased surface area to contact a respective conductive strip on a landing gear of a drone.

In an example embodiment, the first charging pad 120 may be configured to be coupled to a base station (e.g., base station 100 from FIG. 1). In this regard, first charging pad 120 may be a unitary component of the base station 100. In an example embodiment, the first charging pad 120 may be integral to the base station (e.g., base station 100 from FIG. 1).

Figure 3:
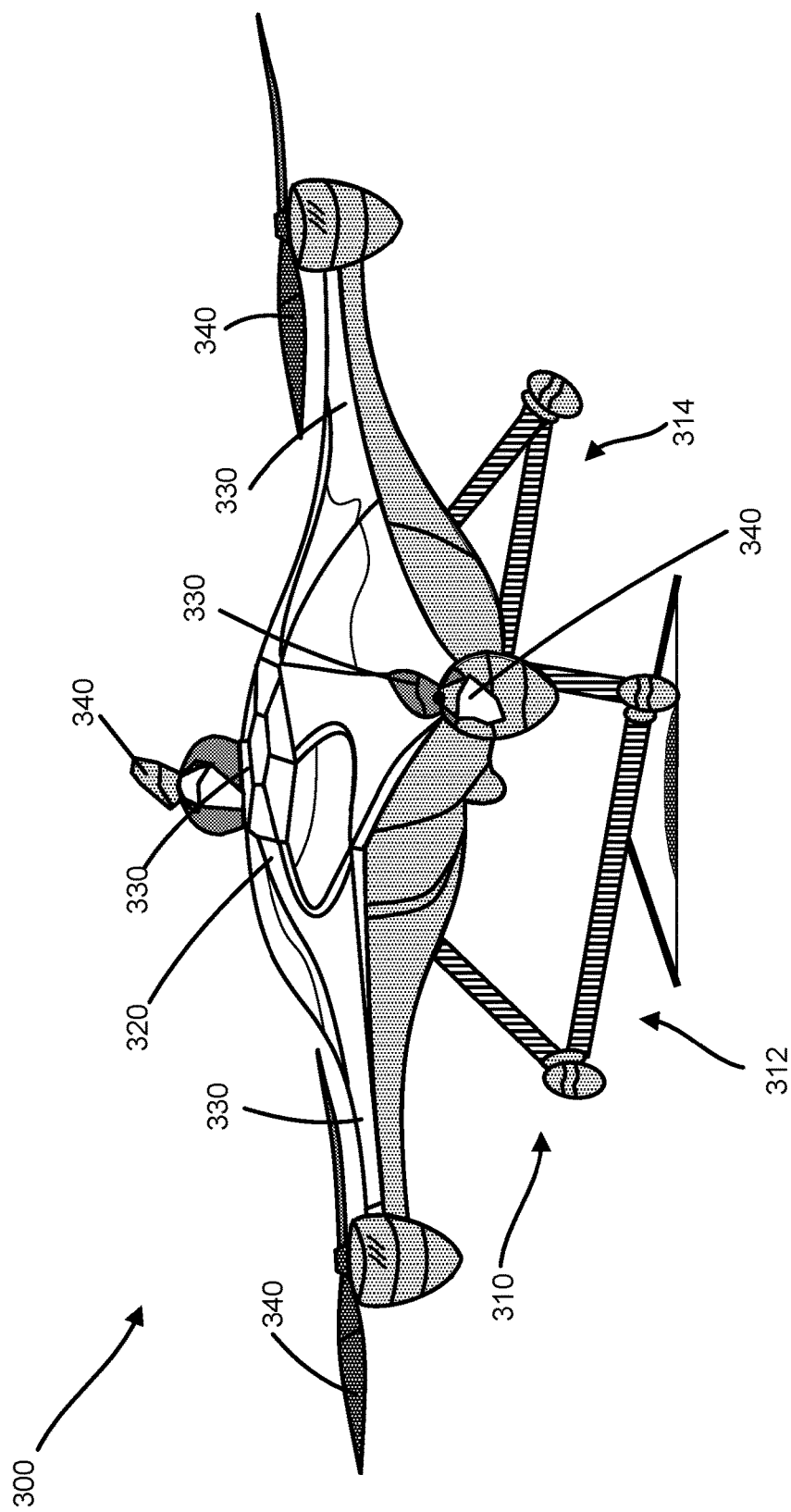
FIG. 3 illustrates an autonomous drone, in accordance with an exemplary embodiment.

With reference now to FIG. 3, an autonomous drone, in accordance with an example embodiment is illustrated. In an example embodiment, an autonomous drone 300 may comprise landing gear 310, a main body 320, a plurality of arms 330, and a plurality of propellers 340. Each arm 330 may couple a respective propeller(s) and motor(s) 340 to the main body 320 of the autonomous drone 300. Additionally, the main body 320 may house the electrical components that allow the drone to operate, such electrical components may comprise a battery, inertial sensors, global positioning systems (GPS), a transceiver (LTE capable), and a computer board(s). Additional electrical components may be added, as needed, such as a spotlight for increased visibility and a parachute recovery system to provide a safety system for the autonomous drone 300.

In an example embodiment, the landing gear 310 may comprise a left landing gear 312 and a right landing gear 314. The left landing gear 312 and the right landing gear 314 may be substantially symmetric about a vertical plane through the center of the autonomous drone 300. Although the landing gear 310 is illustrated with a left landing gear and a right landing gear, any number of landing gear is within the scope of this disclosure.

With combined reference to FIGS. 1 and 3, the first charging pad 120 may be configured to receive the left landing gear 312 and the second charging pad 130 may be configured to receive the right landing gear 314, or vice versa. In an example embodiment, the left landing gear 312 may mirror the right landing gear 314 about a center plane of the main body 320. In this regard, the left landing gear 312 may land in either the first charging pad 120 or the second charging pad 130 and the right landing gear may be configured to land in the other charging pad. In this regard, the base station is adaptable to a landing from various directions of the autonomous drone 300.

Figure 4:
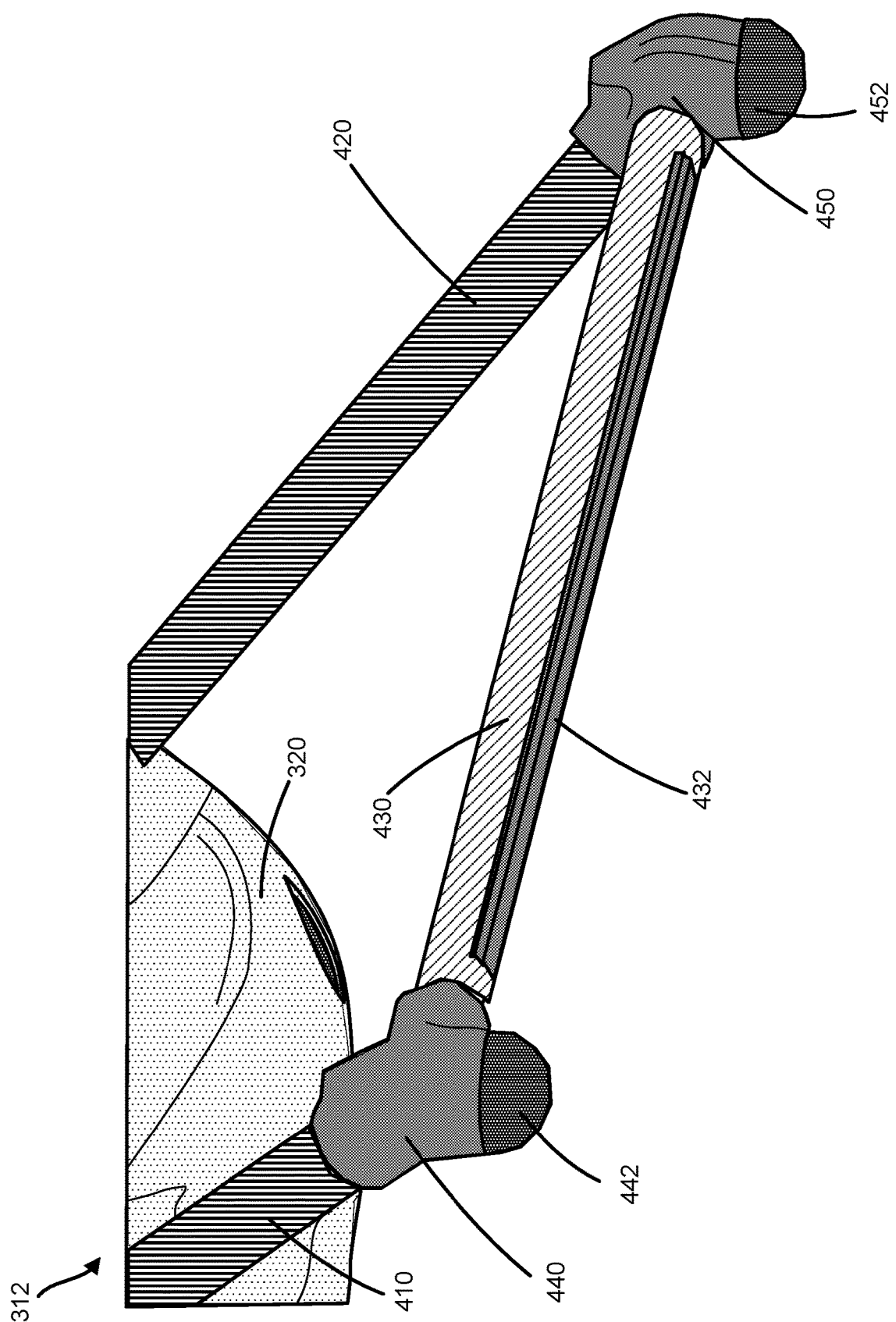
FIG. 4 illustrates a landing gear system, in accordance with an exemplary embodiment.

With reference now to FIG. 4, a left landing gear, in accordance with an example embodiment is illustrated. In an example embodiment, a left landing gear 312 may comprise a left aft leg 410, a left forward leg 420, and a left charging tube 430. The left aft leg 410 may be coupled to the left charging tube 430 at a left aft end 440. The left forward leg 420 may be coupled to the left charging tube 430 at a left forward end 450. The left charging tube 430 may be substantially parallel to the ground when the drone is landed in a base station (e.g., base station 100 from FIG. 1). The left aft leg 410 and the left forward leg 420 may be coupled to the main body 320 of an autonomous drone. The left aft leg 410 and left forward leg 420 may be coupled to the main body 320 by any means known in the art, such as press fit, fastening via a flange and bolts, a pin joint, or any other means known in the art. The left aft end 440 may comprise a left aft landing foot 442 and the left forward end 450 may comprise a left forward landing foot 452. The landing foots 442, 452, may provide a soft surface for the drone to land when the drone is not landing in a base station (e.g., base station 100 from FIG. 1).

With reference back to FIG. 2, the left forward landing foot 452 may align with first aperture 241 or second aperture 251 and the left aft landing foot 442 may align with the first aperture 241 or the second aperture 251. Thus, first aperture 241 and second aperture 251 also ensure that the left charging tube 430 comes into contact with the first conductive groove 210.

In an example embodiment, the left charging tube 430 may comprise a left conductive strip 432. The left conductive strip 432 may be made of any conductive material, such as brass, aluminum, gold-plated nickel, copper, or brass. In an example embodiment, the left conductive strip 432 is made of brass. The left conductive strip 432 may be located on a bottom portion of the left charging tube 430 and may extend 50% to 99% the length of the left charging tube 430. More preferably, the left charging strip may extend from 85% to 99% the length of the left landing leg. The left charging strip may correspond to a respective conductive groove from a base station as previously illustrated in FIGS. 1 and 2. The left conductive strip 432 may be directly wired to a battery in the main body 320 of an autonomous drone. The wiring may be through the left aft leg 410 and/or the left forward leg 420. In an example embodiment, left aft leg 410, left forward leg 420 and left charging tube 430 all contain wiring harnesses. Any common protective material known in the art may be used for the harness, such as plastic, fiberglass, heat shrink tubing, tape, or any other material known in the art. In an example embodiment, the wiring contained within each leg 410, 420, 430 may be made of silicon wire. Although FIG. 4 illustrates a left landing gear 312, the components could equally be applied to a right landing gear 314. Bottom, as referred to herein, refers to being proximate to the ground when the drone is a landed state.

Figure 5:
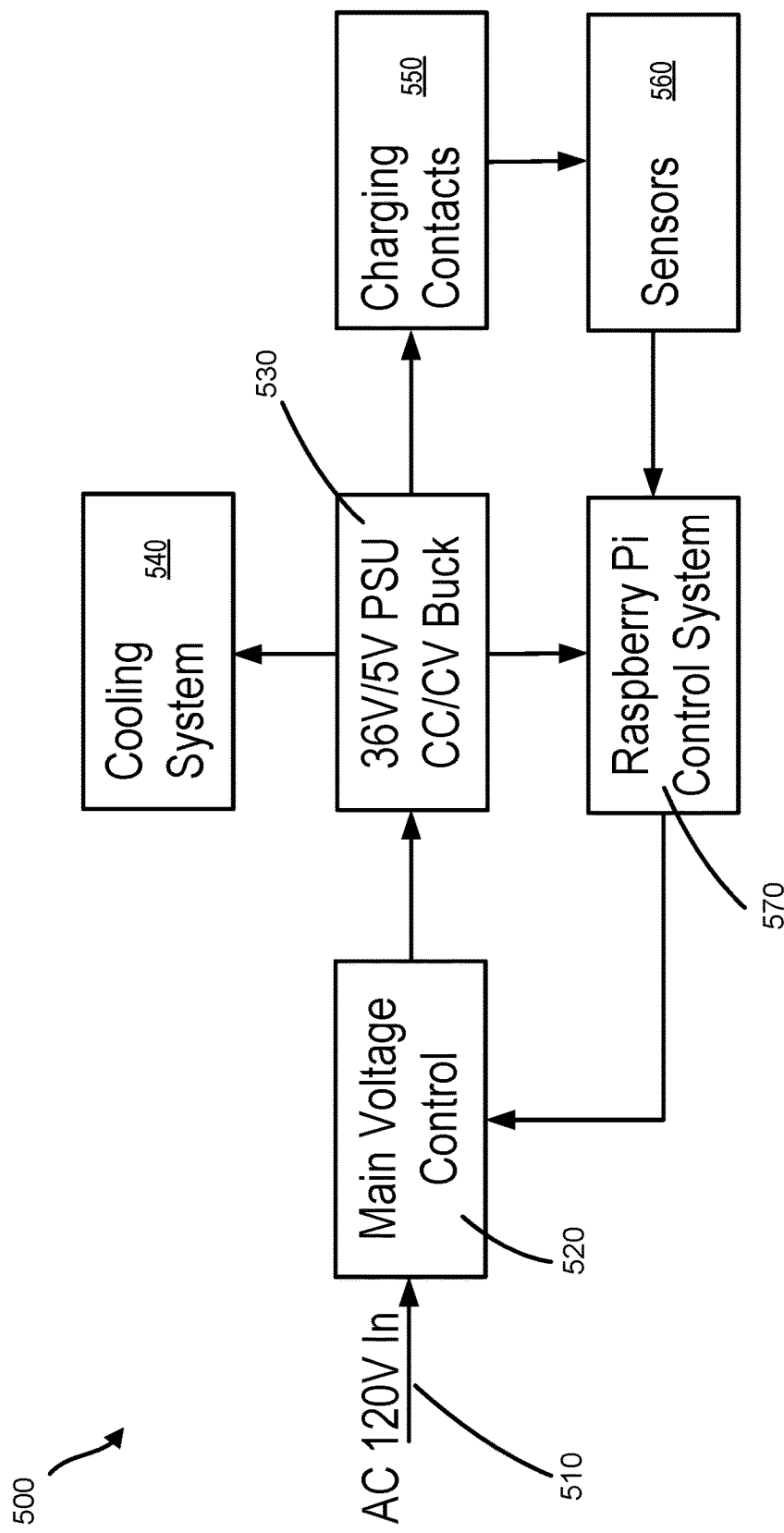
FIG. 5 illustrates a first charging system, in accordance with an exemplary embodiment.

With reference now to FIG. 5, a charging system of a base station system, in accordance with an example embodiment, is illustrated. In an example embodiment, a charging system 500 may comprise a power source 510. In an example embodiment the power source 510 may be generator, a wall outlet, or any other power source commonly used in the art. The power source 510 may provide an alternating current to a main voltage control 520. The main voltage control 520 may be in electrical contact with a buck converter 530. The buck converter 530 may be in electrical contact with a cooling system 540, a charging contact system 550, and a control system 570. The charging contact system may be in electrical contact with a sensor 560, and the sensor 560 may be in electrical contact with the control system 570. The control system 570 may provide feedback to the main voltage control 520.

In an example embodiment, the sensors 560 may be configured to monitor charging contact system 550. For example, sensors may communicate a charge rate, a charge status, a charge level, a temperature, a moisture status, motion status, or any other information pertinent to monitoring of the charging system 500. The control system 570 may further communicate the sensor data to the main voltage control. In response to receiving the sensor data, the main voltage control 520 may control the voltage supplied to the buck converter 530. For example, in an example embodiment, upon reaching a charged state, the main voltage control 520 may turn off and no longer supply a voltage to buck converter 530.

In an example embodiment, the charging system 500 may be configured to provide between 200 and 400 watt output with approximately 90% efficient buck converter 530. In an example embodiment, the charging system 500 may be configured to provide approximately 300 watt output.

In an example embodiment, the sensors 560 may comprise any sensors pertinent to drones and/or charging systems, such as a temperature sensor, a moisture sensor, a motion sensor, a voltage sensor, or the like.

Figure 6A:
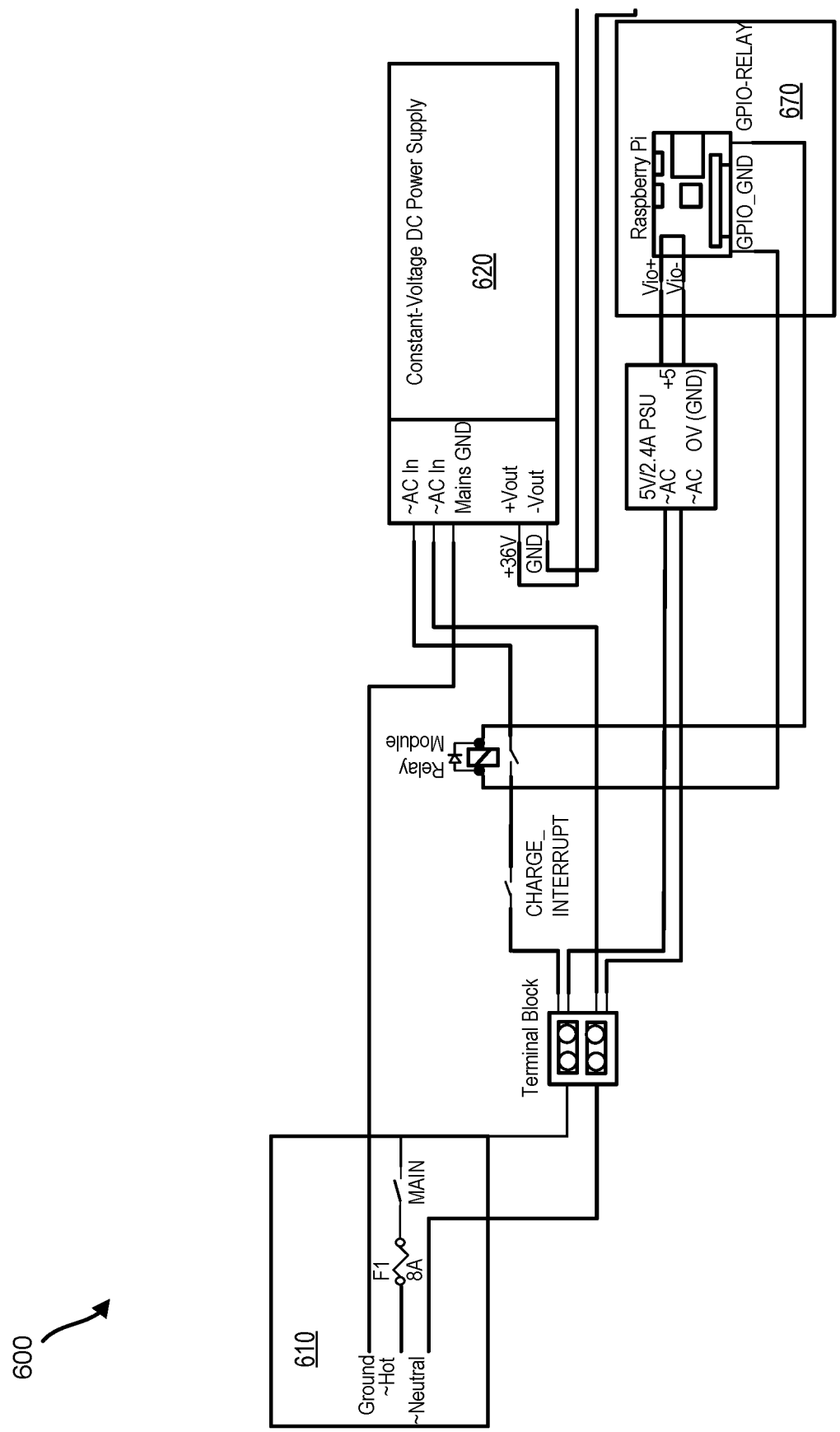
FIGS. 6A and 6B illustrate a first charging system, in accordance with an exemplary embodiment.
Figure 6B:
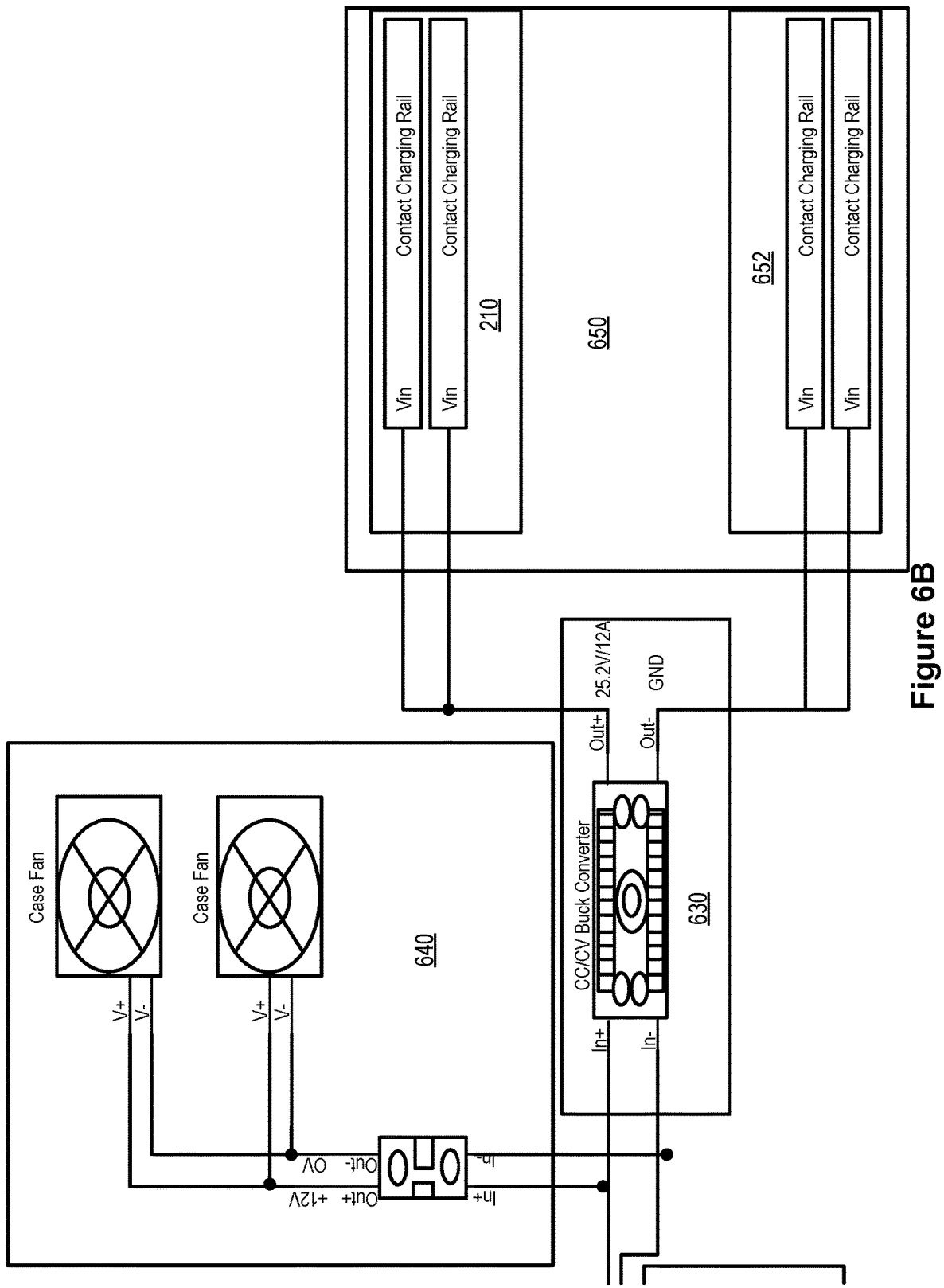

With reference now to FIGS. 6A and 6B, a first charging system of a base station system, in accordance with an example embodiment is illustrated. In an example embodiment, a first charging system 600 comprises a power source 610, a main voltage control 620, a buck converter 630, a cooling system 640, a first contact charging system 650, and a control system 670. The main voltage control 620 may be in electrical contact with the power source 610, the control system 670, the cooling system 640, and the buck converter 630. The first contact charging system 650 may further comprise a first conductive groove 210 and a second conductive groove 652. The first conductive groove 210 may be in electrical contact with a voltage output of a buck converter 630. The second conductive groove 652 may be in electrical communication with a ground output of the buck converter 630. In an example embodiment, the buck converter 630 may be a CC/CV buck converter.

Figure 7:
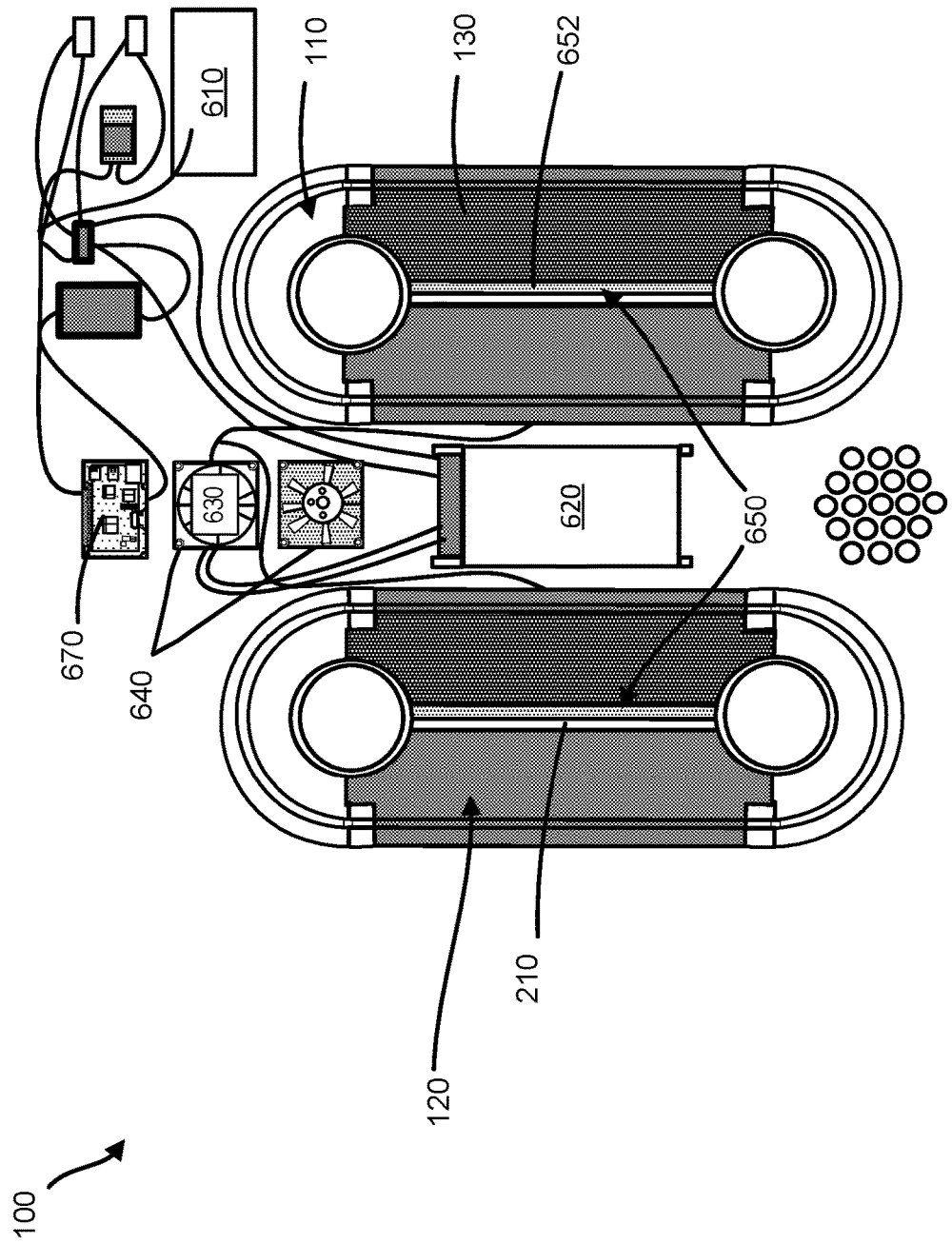
FIG. 7 illustrates a base station system for an autonomous drone, in accordance with an exemplary embodiment.

With reference now to FIG. 7, a base station with the housing removed for clarity, in accordance with an example embodiment, is illustrated. A base station 100 may further comprise a charging system in accordance with the charging system illustrated in FIG. 6. The housing of the base station 100 may include a power source 610, a main voltage control 620, a buck converter 630, a cooling system 640, a first contact charging system 650, and control system 670 disposed therein. In an example embodiment, by having the power source 610, the main voltage control 620, the buck converter 630, the cooling system 640, the first contact charging system 650, and the control system disposed in the housing (e.g., housing 110 from FIG. 1), the components may be protected from moisture, weather, or any other outside factors that may effect the charging system. In an example embodiment, the power source 610 may be external to the housing 110.

Figure 8A:
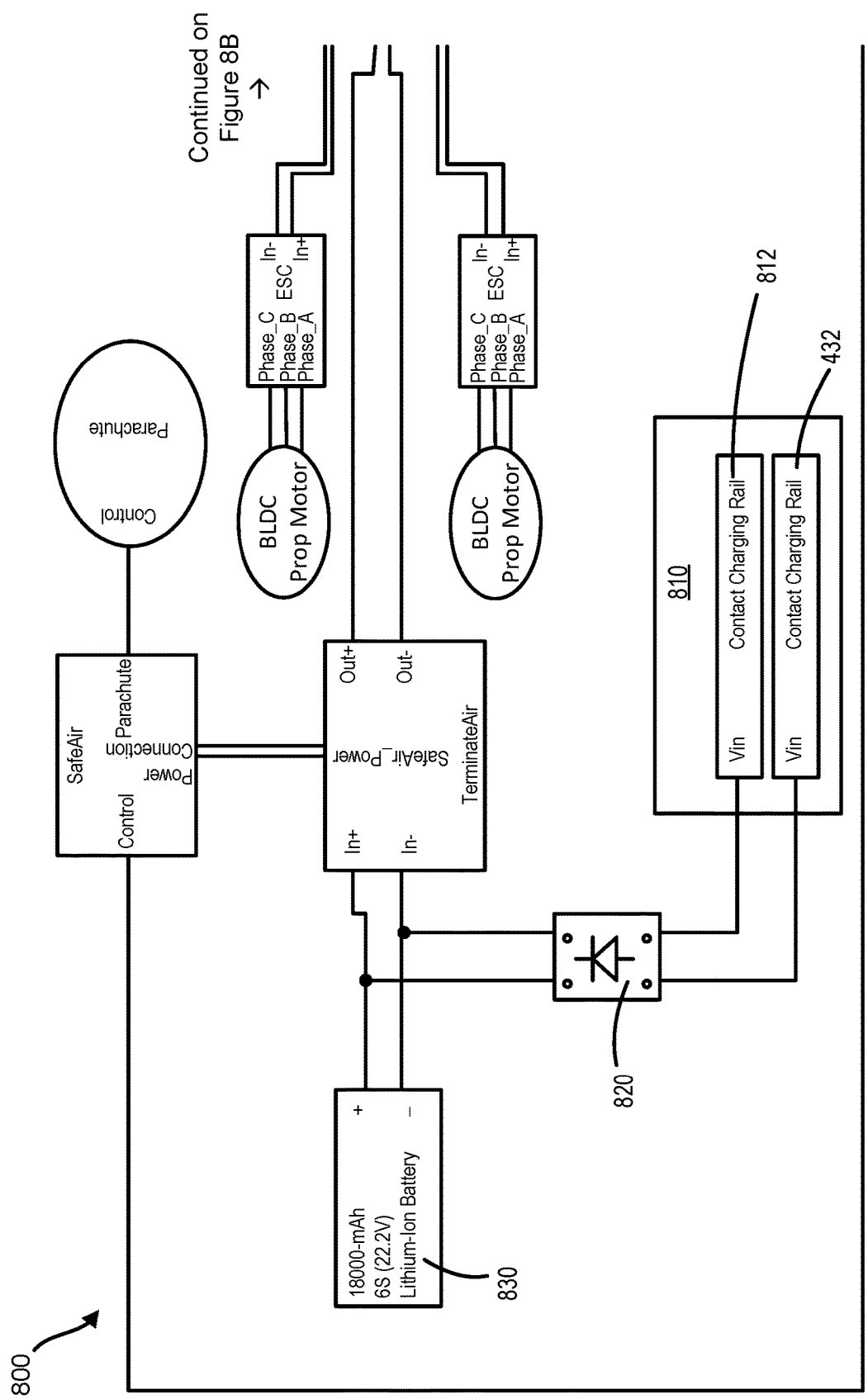
FIGS. 8A and 8B illustrates a second charging system in accordance with an exemplary embodiment.
Figure 8B:
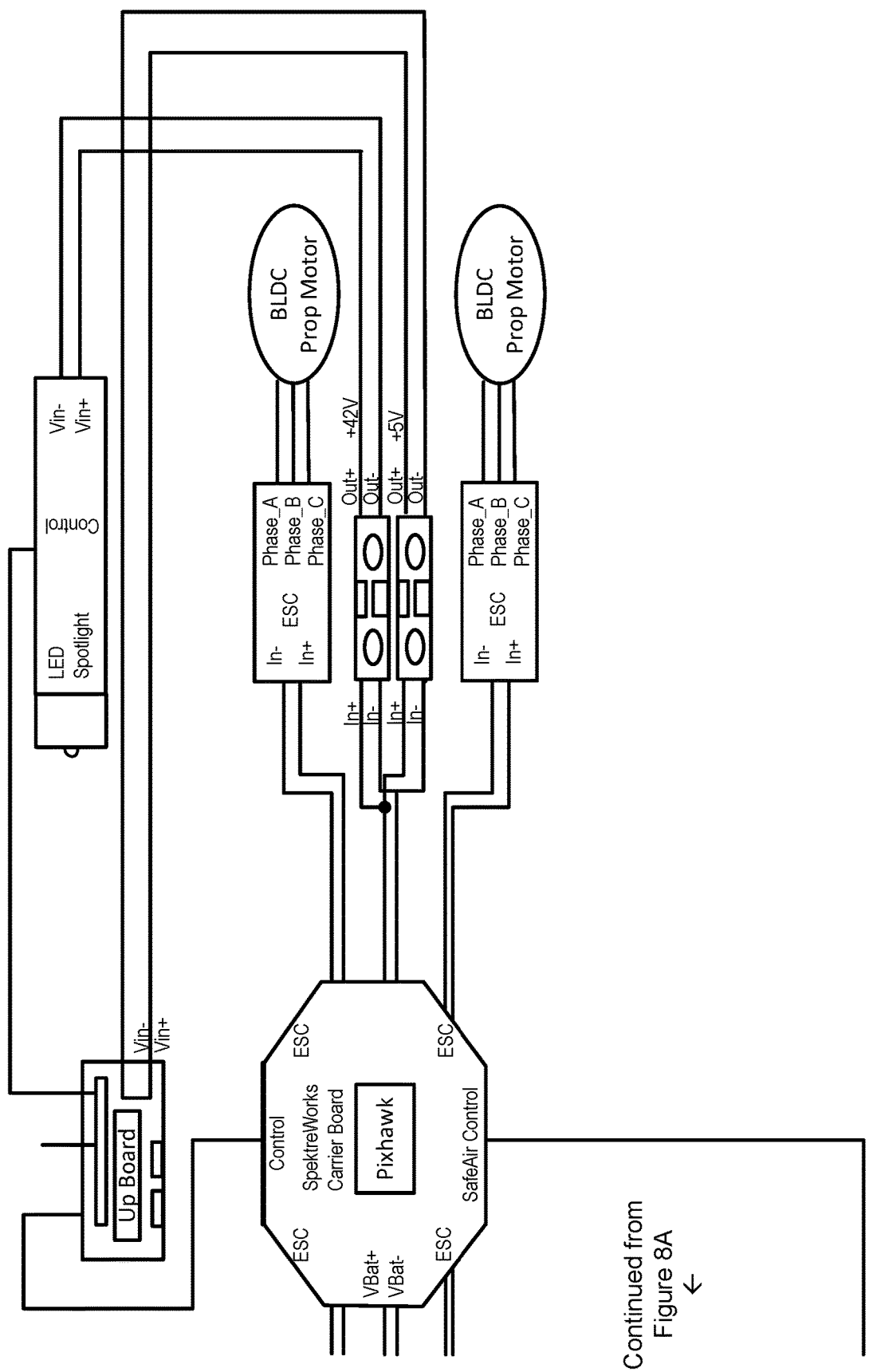

With reference now to FIGS. 8A and 8B, a second charging system of an autonomous drone, in accordance with an example embodiment, is illustrated. In an example embodiment, a second charging system 800 corresponds to a first charging system (500, 600) of a base station 100. The second charging system 800 may comprise a second contact charging system 810, a diode array 820 and a battery 830. The second contact charging system 810 may comprise a left conductive strip 432 and a right conductive strip 812. The left conductive strip 432 may correspond to a first conductive groove 210 or a second conductive groove 652 of a base station 100. Similarly, the right conductive strip 812 may correspond to a first conductive groove 210 or a second conductive groove 652. The diode array 820 may be electrically connected to the second contact charging system 810 and the battery 830. The battery 830 may comprise a lithium-ion battery, a lithium polymer battery, or any other battery known in the art. In an example embodiment, the battery 830 is a lithium polymer battery.

The diode array 820 may ensure that current flows in a single direction, from the second contact charging system 810 to the battery 830. The diode array 820 may ensure that the battery 830 is charged when the left conductive strip 432 is in contact with the first conductive groove 210 and the right conductive strip 812 is in contact with the second conductive groove 652. Similarly, the diode array 820 may ensure that the battery 830 is charged when the left conductive strip 432 is in contact with the second conductive groove 652 and the right conductive strip 812 is in contact with the first conductive groove 210. This may allow the autonomous drone 300 to land on the base station 100 in two different orientations and still charge the autonomous drone 300.

In an example embodiment, a base station system, as disclosed herein, may provide significantly lower cost relative to typical base station systems. In an example embodiment, base station 100 may provide scalability by having a basic manufacturing process and inexpensive material and machining relative to typical base station systems. In an example, embodiment, base station 100 may have low maintenance. In this regard, the base station 100 includes no moving parts, an internal monitoring system, and/or extended battery life from the internal monitoring system.

While the principles of this disclosure have been shown in various embodiments, many modifications of structure, arrangements, proportions, the elements, materials and components, used in practice, which are particularly adapted for a specific environment and operating requirements may be used without departing from the principles and scope of this disclosure. These and other changes or modifications are intended to be included within the scope of the present disclosure.

The present disclosure has been described with reference to various embodiments. However, one of ordinary skill in the art appreciates that various modifications and changes can be made without departing from the scope of the present disclosure. Accordingly, the specification is to be regarded in an illustrative rather than a restrictive sense, and all such modifications are intended to be included within the scope of the present disclosure. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element.

As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Also, as used herein, the terms "coupled," "coupling," or any other variation thereof, are intended to cover a physical connection, an electrical connection, a magnetic connection, an optical connection, a communicative connection, a functional connection, and/or any other connection. When language similar to "at least one of A, B, or C" or "at least one of A, B, and C" is used in the specification or claims, the phrase is intended to mean any of the following: (1) at least one of A; (2) at least one of B; (3) at least one of C; (4) at least one of A and at least one of B; (5) at least one of B and at least one of C; (6) at least one of A and at least one of C; or (7) at least one of A, at least one of B, and at least one of C.

What is claimed is:

1. A base station system for an autonomous drone, comprising:
    a base station, comprising:
        a housing;
        a power source;
        a first charging pad coupled to the housing; and
        a second charging pad proximate the first charging pad, wherein the first charging pad comprises a first conductive groove in electrical contact with the power source,
        wherein the second charging pad comprises a second conductive groove in electrical contact with the power source,
        wherein the first charging pad and the second charging pad each comprise a first tapered portion and a second tapered portion, and
        wherein the first tapered portion and the second tapered portion are terminated at the first conductive groove and the second conductive groove.

2. The base station system of claim 1, wherein the first charging pad and the second charging pad each comprise a first end and a second end with the first conductive groove and the second conductive groove are disposed between the first end and the second end, the first end having a first aperture and the second end having a second aperture.

3. The base station system of claim 1, wherein the first conductive groove and the second conductive groove are configured to receive a first conductive strip and a second conductive strip of a landing gear of a drone.

4. The base station system of claim 1, wherein the first charging pad and the second charging pad form a charging contact array.

* * * * *